United States Patent [19]
Miyaoka

[11] Patent Number: 5,923,442
[45] Date of Patent: Jul. 13, 1999

[54] FACSIMILE WHICH CONTROLS RECEIVED DATA DESTINATION AND STORES OR PRINTS THE DATA IF THE DESTINATION IS UNAVAILABLE

[75] Inventor: Hiroshi Miyaoka, Saitama, Japan

[73] Assignee: Fuji Xerox Co., Ltd., Tokyo, Japan

[21] Appl. No.: 08/732,556

[22] Filed: Oct. 15, 1996

[30] Foreign Application Priority Data

Oct. 16, 1995 [JP] Japan ................................. 7-293688

[51] Int. Cl.⁶ .............................. H04N 1/00; H04N 1/40; H04N 1/32; H04M 11/00
[52] U.S. Cl. ........................ 358/442; 358/400; 358/404; 358/407; 358/435; 358/438; 358/439; 358/444; 358/468; 379/100.01
[58] Field of Search .................... 358/400, 402, 358/404, 407, 434, 435, 437, 438, 439, 442, 444, 468, 296, 405, 436; 379/100.01, 100.05, 100.06, 100.09, 100.12, 100.15, 100.02; 399/82, 83, 85; 395/200.45, 200.46, 200.69

[56] References Cited

U.S. PATENT DOCUMENTS

| | | | |
|---|---|---|---|
| 4,573,083 | 2/1986 | Shimizu | 358/407 |
| 4,907,094 | 3/1990 | Mishima et al. | 358/437 |
| 5,552,901 | 9/1996 | Kikuchi et al. | 358/468 |

FOREIGN PATENT DOCUMENTS

| | | |
|---|---|---|
| 0 291 777 | 11/1988 | European Pat. Off. |
| 0 312 894 | 11/1988 | European Pat. Off. |
| 5-276302 | 10/1993 | Japan. |
| 5-276320 | 10/1993 | Japan. |

*Primary Examiner*—Edward L. Coles
*Assistant Examiner*—Mark Wallerson
*Attorney, Agent, or Firm*—Finnegan, Henderson, Farabow, Garrett & Dunner, L.L.P.

[57] ABSTRACT

A facsimile apparatus connected to an external terminal device and a communication line, includes a storing unit which stores mode information indicating which apparatus, either the external terminal device or the facsimile apparatus, receives data; and a control unit which causes the facsimile apparatus to receive the data if the mode information indicates external terminal device reception and if the external terminal device is not available to receive the data. The facsimile apparatus further includes a control unit which causes temporal transferring of the received data to the external terminal device, reading of the transferred received data from the external terminal device, and printing of the read data after the facsimile apparatus has become available to print if the mode information indicates facsimile apparatus reception and if the facsimile apparatus is not available to print or store the received data.

3 Claims, 3 Drawing Sheets

FACSIMILE WHICH CONTROLS RECEIVED DATA DESTINATION AND STORES OR PRINTS THE DATA IF THE DESTINATION IS UNAVAILABLE

BACKGROUND OF THE INVENTION

The invention relates to a facsimile apparatus, and more particularly to a facsimile apparatus that can control the destination to which received data is outputted, the facsimile apparatus being connected to an external terminal device such as a personal computer (hereinafter referred to as "PC" whenever applicable).

One exemplary conventional facsimile apparatus that can transfer received image data to an external computer is disclosed in Unexamined Japanese Patent Publication No. Hei. 5-276302. This facsimile apparatus includes: a mode specifying means that specifies in advance the mode that determines a destination, either an external computer 20 or a printer 21, to which received image data is transferred; and a control means that controls the apparatus in such a manner that the received data can be transferred selectively either to the external computer 20 or to the printer 21. Therefore, the user can select the destination in accordance with circumstances or with a time schedule; i.e., the user can select a mode from the mode in which the received image data is transferred to the external computer and the mode in which the received image data is outputted to the printer.

In the aforementioned facsimile apparatus, when the specified destination is not available to store or output the received data, e.g., if the specified destination is the external computer and if the external computer is turned off or has the buffer thereof full of data, or if the specified destination is the printer and if recording sheets are not available in the printer with the receiving buffer of the printer being full of data, neither destination devices are available to receive the data. In this case, there exists the problem that these devices must send an error signal to the transmitting apparatus, stop communication, and request re-transmission after the error has been recovered.

SUMMARY OF THE INVENTION

An object of the invention is to overcome the aforementioned problem and therefore to provide a facsimile apparatus that can reliably receive data taking advantage of hardware resources effectively, the facsimile apparatus being connected to an external terminal device such as a personal computer.

To achieve the above object, the invention is applied to a facsimile apparatus that is connected to an external terminal device and a communication line, the facsimile apparatus including: a mode storage means for storing mode information indicating which apparatus, either the external terminal device or the facsimile apparatus, receives data sent through the communication line; and a control means for causing the facsimile apparatus to receive the data if the mode information stored in the mode storage means is external terminal device reception and if the external terminal device is not available to receive the data. Further, the facsimile apparatus includes: the mode storage means; and a control means for temporarily transferring the received data to the external terminal device and reading the received data from the external terminal device and printing the data after the facsimile apparatus has become available to print if the mode information stored in the mode storage means is facsimile apparatus reception and if the facsimile apparatus is not available to print or buffer the received data.

As a result of the aforementioned construction, the invention not only allows a personal computer to communicate taking advantage of a modem of a facsimile apparatus, but also allows the mode specifying means to specify the received data output destination. Further, when the specified output destination is not operable, the received data can be transferred to another output destination that is operable. Therefore, a hardware resource such as the modem of the facsimile apparatus or a software resource of the personal computer can be utilized effectively, and even if one of the apparatuses is inoperable, the received data can be stored temporarily or outputted so that the data can be received more reliably. Moreover, if it is so arranged that the user specifies the data output destination or the like from the personal computer side, then the number of circuits on the facsimile apparatus side can be reduced, and a sophisticated user interface can be utilized.

DETAILED DESCRIPTION OF THE INVENTION

Figure 5:
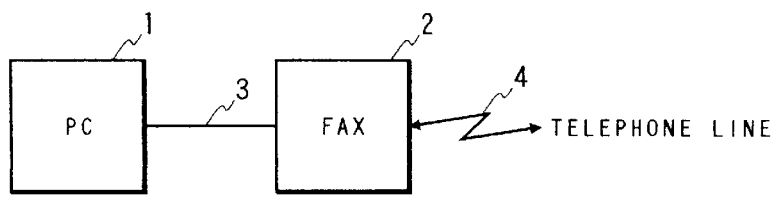
FIG. 5 is a block diagram showing an exemplary system configuration including the facsimile apparatus of the invention.

The invention will now be described in detail with reference to the drawings. FIG. 5 is a block diagram showing an exemplary system configuration including a facsimile apparatus 2 of the invention. The facsimile apparatus 2 is connected to a telephone line 4 and to a personal computer (PC) 1, e.g., through an RS232C connection cable 3.

Figure 1:
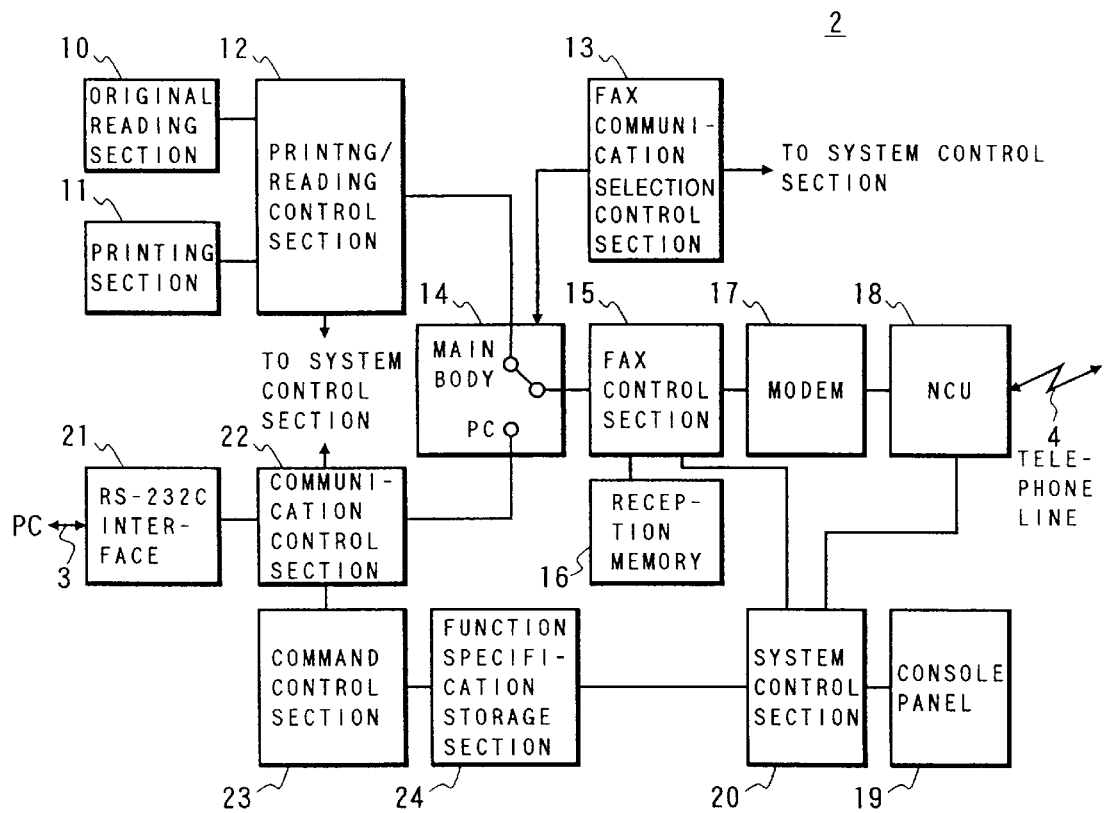
FIG. 1 is a block diagram showing a configuration of a facsimile apparatus of the invention.

FIG. 1 is a block diagram showing a configuration of the facsimile apparatus 2 of the invention. The facsimile apparatus 2 has a communication function added to a conventional ordinary facsimile apparatus so that data and commands can be intercommunicated with an external terminal device such as a PC. An original reading section 10 reads data of an original by means of, e.g., a CCD image sensor and then converts the read data into an electric signal. A printing section 11 prints the received image data. A printing/reading control section 12 controls the original reading section 10 and the printing section 11 based on an instruction from a system control section 20.

A FAX control section 15 performs data transmission and communication control in facsimile communications, image data contraction and expansion, and the like, and stores image data to be transmitted or received image data in a reception memory 16 whenever necessary. A modem 17 converts image data or commands into an ac signal that is within a frequency range communicable through the telephone line based on a predetermined specification. A network control section (NCU) 18 controls telephone line connection. A console panel 19 receives an instruction from a user and sends the instruction to the system control section 20.

An RS232C interface section 21 is arranged for transmitting and receiving image data, commands, or the like to and from the PC. A communication control section 22 controls communication with the PC, separates the received image data from the received command, and transfers the image data to a switching section 14 and the command to a command control section 23, respectively. The command control section 23 analyzes the content of a command received from the communication control section 22 and updates reception mode information stored in, e.g., a function specification storage section 24 based on the result of the analysis.

The system control section 20 controls the entire part of the facsimile apparatus based on processing to be described later, and sends switching control information in a switching section 14 to a FAX communication selection control section 13 whenever necessary. The FAX communication selection control section 13 switches the switching section 14 based on such switching control information. It may be noted that a hardware configuration of the facsimile apparatus 2 is such that various control sections within the facsimile apparatus 2 are constructed of software and operated with a single or a plurality of CPUs that execute programs corresponding to the functions of the respective control sections whenever necessary.

Figure 2:
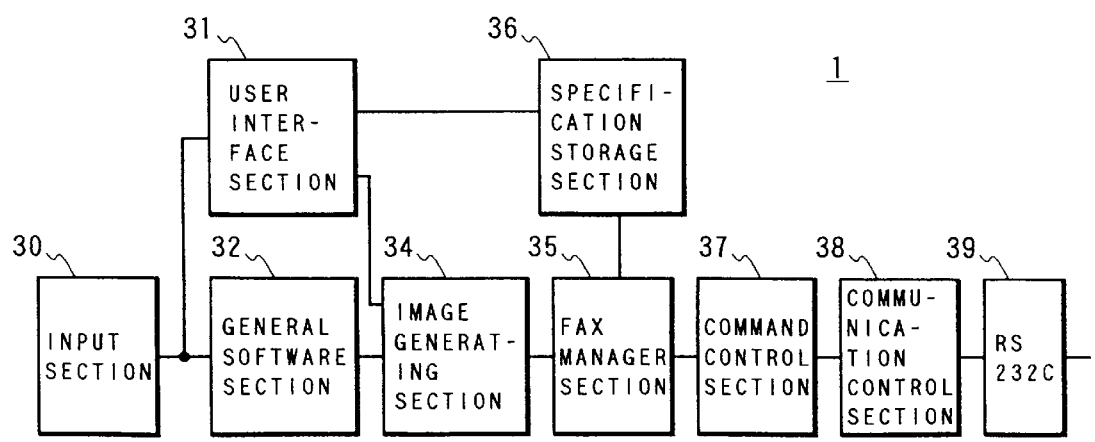
FIG. 2 is a block diagram showing a function of a personal computer, which is an external terminal device.

FIG. 2 is a block diagram showing the functions of the PC 1, which is an external terminal device. An input section 30 corresponds to, e.g., a key board, a mouse, or the like of the PC. A user interface section 31 corresponds to various application programs providing user interface. The transmission and reception functions of the facsimile apparatus 2 are specified using the user interface. The specified transmission and reception functions are stored in a specification storage section 36. A general software section 32 includes application software such as word processing software and has document data transmission and reception commands.

An image generating section 34 converts document data, graphic data, or the like to be transmitted into bit map data. A FAX manager section 35 manages input/output of data with the facsimile apparatus 2. A command control section 37 intercommunicates commands with command control section 23 of the facsimile apparatus 2, and updates the reception mode information within the function specification storage section 24 of the facsimile apparatus 2 based on, e.g., reception mode information specified by the user. A communication control section 38 performs transmission control operations such as error check and re-transmission for data transfer with respect to the communication control section 22 within the facsimile apparatus 2. An RS232C interface section 39 transmits and receives signal waveforms that conform to the RS232c standards.

In order to switch the reception mode of the facsimile apparatus 2 from the PC 1, a mode switching instruction is inputted from the input section 30 through the user interface section 31. When the instruction has been given, not only the reception mode information stored in the specification storage section 36 is updated, but also a mode switching command is sent from the command control section 37 to the facsimile apparatus 2. On the side of the facsimile apparatus, the command is received by the command control section 23, and the reception mode information stored in the function specification storage section 24 is updated.

Figure 3:
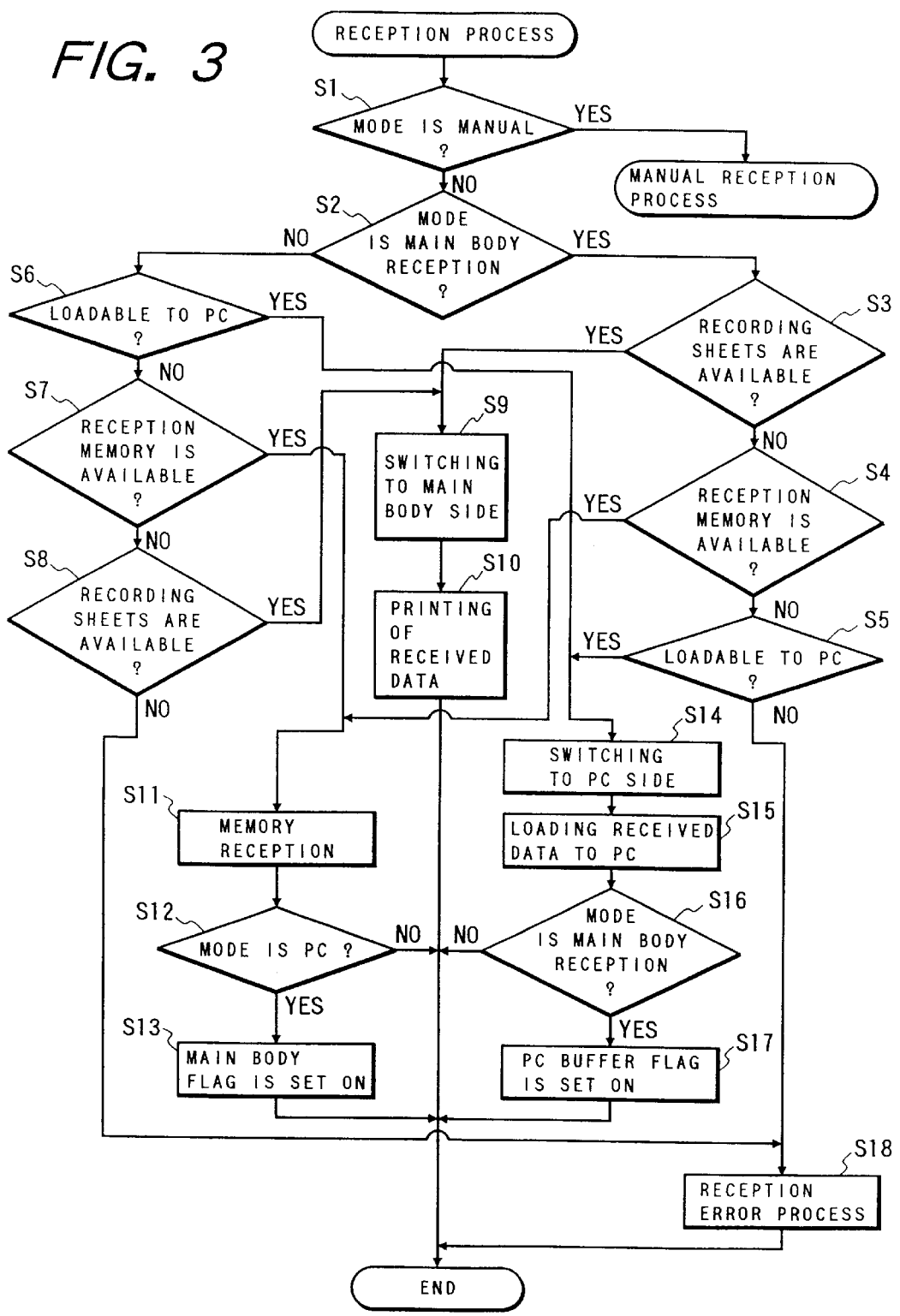
FIG. 3 is a flowchart showing processing at the time of receiving data by the facsimile apparatus of the invention.

FIG. 3 is a flowchart showing the processing at the time of receiving data by the facsimile apparatus 2 of the invention. This processing is activated every time the NCU 18 detects reception of data through the telephone line. In Step S1, whether or not the reception mode information stored in the function specification storage section 24 is the manual reception mode is judged. If it is judged affirmative, manual reception processing is executed. In manual reception processing, the facsimile apparatus informs the user of the reception-with a dial tone, and the user who has picked up the handset presses a start switch on the main body when he or she wishes to receive the data by facsimile. If the data is to be received by the PC, the user causes the PC to send a command for switching the reception mode to the PC reception mode.

In Step S2, whether the reception mode is set to the main body reception mode or the PC reception mode is judged. If the reception mode is set to the main body reception mode, then Step S3 will be executed. If the reception mode is set to the PC reception mode, then Step S6 will be executed. In Step S3, whether or not recording sheets for printing are available is judged. If it is judged affirmative, then Step S9 will be executed. If, on the other hand, it is judged negative in Step S3, then Step S4 will be executed. In Step S4, whether or not there is sufficient space in the reception memory 16 is judged. If it is judged affirmative, then Step S11 will be executed. If, on the other hand, it is judged negative in Step S4, then Step S5 will be executed. In Step S5, whether or not the data is loadable to the PC is judged. If it is judged affirmative, then Step S14 will be executed. If, on the other hand, it is judged negative in Step S5, then Step S11 will be executed.

In the PC reception mode, whether or not the data is loadable to the PC is judged in Step S6. If it is judged affirmative, then Step S14 will be executed. If, on the other hand, it is judged negative, then Step S7 will be executed. It may be noted that whether or not the data is loadable to the PC is judged by, e.g., the following conditions. The control line of the RS232C indicates that the PC is operable and confirms that the PC is operable by exchanging commands between the communication control section 38 on the PC side and the communication control section 22 on the facsimile apparatus side. In Step S7, whether or not there is sufficient space in the reception memory 16 is judged. If it is judged affirmative, then Step S11 will be executed. If, on the other hand, it is judged negative, then Step S8 will be executed. In Step S8, whether or not recording sheets for printing are available is judged. If it is judged affirmative, then Step S9 will be executed. If, on the other hand, it is judged negative, then Step S18 will be executed.

In Step S9, the system control section 20 sets the switching section 14 to the main body side through the FAX communication selection control section 13. In Step S10, the image data received by the FAX control section 15 is transferred to the printing and reading control section 12, and the printing and reading control section 12 prints the image data by controlling the printing section 11.

In Step S11, the FAX control section 15 stores the received image data once in the reception memory 16. In Step S12, whether or not the current reception mode is set to the PC reception mode is judged. If it is judged affirmative, then Step S13 will be executed, and a main body buffer flag stored in a memory within the system control section 20 is set to "ON".

In Step S14, the system control section 20 switches the switching section 14 to the PC side through the FAX communication selection control section 13. In Step S15, the FAX control section 15 transfers the image data received to the PC through the communication control section 22 and the RS232C interface section 21. It should be noted that information indicating either that the data is outputted to the PC or that the data is temporarily sent to the PC and returned to the facsimile apparatus thereafter may be sent to the PC together with the image data during transfer.

When the FAX manager section 35 receives the data, the PC stores the data in a buffer and indicates to the user that the data has been received. As instructed by the user, the PC either indicates such information on a display or causes a printer to output such information. It may be noted that if the reception mode is set to the main body reception mode, or if the received data indicates that the received data is to be temporarily stored, then the FAX manager section 35 only stores the data in the buffer without giving any indication to the user.

In Step S16, whether or not the current reception mode is set to the main body reception mode is judged. If it is judged affirmative, then Step S17 will be executed and a PC buffer flag stored in the memory within the system control section 20 is set to "ON". It may be noted that if neither output destinations are operable, then Step S18 will be executed. In Step S18, reception error processing such as reception rejection is executed.

Figure 4:
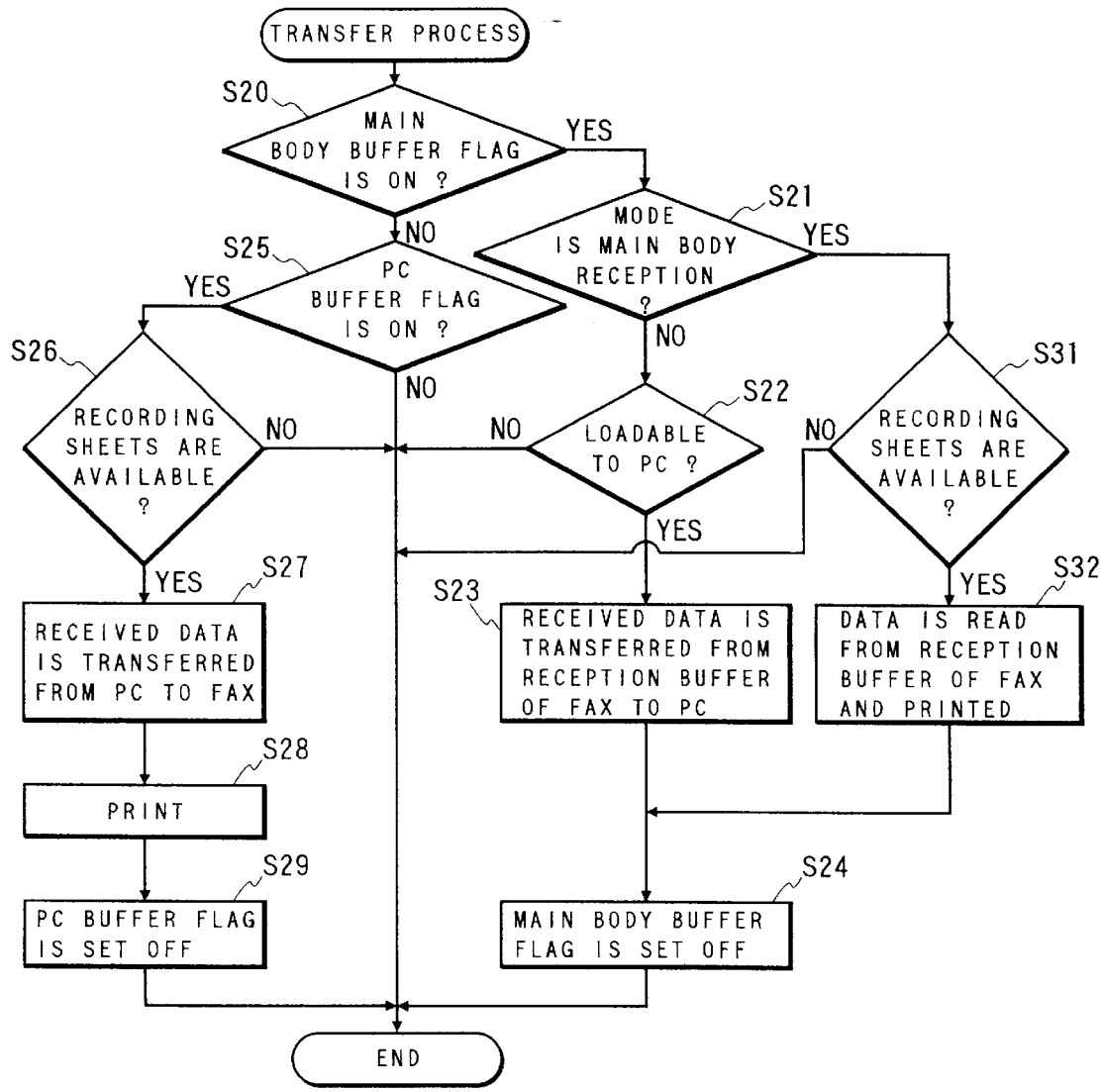
FIG. 4 is a flowchart showing transfer processing that is cyclically activated in the facsimile apparatus of the invention.

FIG. 4 is a flowchart showing transfer processing that is cyclically activated in the facsimile apparatus 2. In Step S20, whether or not the main buffer flag is set to "ON" is judged. If it is judged affirmative, then Step S21 will be executed. In Step S21, whether or not the reception mode is set to the main body reception mode is judged. If it is judged negative, then Step S22 will be executed. If, on the other hand, it is judged affirmative, then Step S31 will be executed. In Step S31, whether or not recording sheets are available is judged. If it is judged negative, the facsimile apparatus 2 terminates the processing. If, on the other hand, it is judged affirmative, then Step S32 will be executed. In Step S32, the data is read from the reception memory 16 of the facsimile apparatus 2 and is thereafter printed. Then, Step S24 will be executed. In Step S22, whether or not the data is loadable to the PC is judged. If it is judged affirmative, then Step S23 will be executed. In Step S23, the facsimile apparatus 2 transfers to the PC the received data stored in the reception memory 16. In Step S24, the main body reception buffer is set to "OFF".

In Step S25, whether or not the PC buffer flag is set to "ON" is judged. If it is judged affirmative, then Step S26 will be executed. In Step S26, whether or not recording sheets are available is judged. If it is judged affirmative, then Step S27 will be executed. In Step S27, the facsimile apparatus sends a transferred data return command. When the return command is received by the FAX manager section 35, the PC transfers to the facsimile apparatus the received data that has been temporarily transferred to and stored in the PC. In Step S28, the transferred data is printed. In Step S29, the PC buffer flag is set to "OFF".

While the embodiment of the invention has been described in the foregoing, the following modifications may be made. The embodiment discloses the example in which data is outputted to the printing section when both the PC and the main body reception memories are unusable even if the reception mode is set to the PC reception mode. However, when the reception mode is set to the PC reception mode, it may be designed so that data will not be outputted to the printing section, or that whether or not the data is outputted can be instructed from the PC or from a console panel.

While the example in which the reception mode is specified and altered from the PC has been disclosed, the reception mode may be altered also from a console panel. In this case, it may be so designed that the PC is informed of the altered information.

As described in the foregoing, the invention not only allows a personal computer to communicate using a modem of a facsimile apparatus, but also permits received data output destination to be specified with a mode specifying means. Further, if the specified output destination is inoperable, the received data is transferred to another operable output destination. Therefore, hardware resources such as a modem of a facsimile apparatus or software resources of a PC can be utilized effectively, and even if one of the apparatuses is inoperable, data can be received more reliably by either temporarily storing the data in or outputting the data to the other apparatus. Moreover, by specifying various modes and functions of the facsimile apparatus from the PC, the facsimile apparatus does not have to have complicated circuits and elements for display and specification, and can specify functions and modes with ease by taking advantage of sophisticated user interface functions of the PC.

What is claimed is:

1. A facsimile apparatus connected to an external terminal device and a communication line, comprising:

mode storage means for storing mode information indicating which apparatus, either the external terminal device or the facsimile apparatus, receives data sent through the communication line; and control means for causing temporal transferring of the received data to the external terminal device, reading of the received data from the external terminal device, and printing of the data after the facsimile apparatus has become available to print if the mode information stored in the mode storage means is facsimile apparatus reception and if the facsimile apparatus is not available to print or store the received data.

2. A facsimile apparatus according to claim 1, further comprising a mode specifying means for specifying a content of the mode storage means based on an instruction from the external terminal device.

3. A receiving method of a facsimile apparatus connected to an external terminal device and a communication line comprising mode storage means for storing mode information indicating which apparatus, either the external terminal device or the facsimile apparatus, receives data sent through the communication line; and control means for causing reception of the data based on the mode information stored in the mode storage means, the receiving method comprising the steps of:

temporarily transferring the received data to the external terminal device, reading the received data from the external terminal device, and printing the data after the facsimile apparatus has become available to print, if the mode information stored in the mode storage means is facsimile apparatus reception and if the facsimile apparatus is not available to print or store the received data.

* * * * *

UNITED STATES PATENT AND TRADEMARK OFFICE
CERTIFICATE OF CORRECTION

PATENT NO. :
DATED :   5,923,442
INVENTOR(S) :   July 13, 1999
Miyaoka It is certified that error appears in the above-identified patent and that said Letters Patent is hereby corrected as shown below:

Claim 1, column 6, line 37, after "print", insert --,--.

Signed and Sealed this

Eighth Day of February, 2000

*Attest:*

Q. TODD DICKINSON

*Attesting Officer*   *Commissioner of Patents and Trademarks*